United States Patent
Orlowski et al.

[11] Patent Number: 6,062,568
[45] Date of Patent: May 16, 2000

[54] BEARING ISOLATOR WITH AIR PURGE

[76] Inventors: David C. Orlowski, 2901 106th Ave. West, Milan, Ill. 61264; Neil Hoehle, 14314-139th Ave. Ct. West, Taylor Ridge, Ill. 61284

[21] Appl. No.: 08/891,214

[22] Filed: Jul. 10, 1997

[51] Int. Cl.[7] .................................................. F16J 15/32
[52] U.S. Cl. .......................... 277/348; 277/412; 277/420; 277/431
[58] Field of Search ..................... 277/348, 303, 277/304, 411, 412, 420, 419, 408, 431

[56] References Cited

U.S. PATENT DOCUMENTS

| | | | |
|---|---|---|---|
| 3,062,554 | 11/1962 | McGahan et al. | 277/348 X |
| 3,117,792 | 1/1964 | Glenn et al. | 277/348 X |
| 3,127,181 | 3/1964 | Crego et al. | 277/420 X |
| 3,168,871 | 2/1965 | Sieghartner | 277/348 X |
| 3,218,085 | 11/1965 | Grace | 277/348 |
| 3,697,088 | 10/1972 | Hummer | 277/348 |
| 4,460,180 | 7/1984 | Koistinen | 277/304 |
| 4,471,964 | 9/1984 | Kotzur | 277/420 X |
| 5,028,054 | 7/1991 | Peach | 277/348 |
| 5,221,095 | 6/1993 | Orlowski | 277/420 X |
| 5,658,127 | 8/1997 | Bond et al. | 277/408 X |

*Primary Examiner*—Terry Lee Melius
*Assistant Examiner*—John R. Cottingham
*Attorney, Agent, or Firm*—Rockey, Milnamow & Katz, Ltd.; H. Vincent Harsha

[57] ABSTRACT

This invention discloses an improved seal utilizing an optional air purge to assist in the elimination or removal of contaminants. The seal is most useful on spindles and utilizes a combination locking ring and diffuser ring to diffuse the air when utilized within the seal member itself. The pressurized air is passed from the diffuser into at least one cavity or chamber which is within the rotor of the seal and which, when the rotor is rotating it provides a centrifuging effect to efficiently and completely remove or eliminate contaminants, including the fluid, and thus preventing the contaminants from reaching the bearings which the seal or bearing isolator is protecting. The bearing isolator or seal element will operate efficiently with or without air pressure, but operates more effectively with requisite air pressure and volume applied to the diffuser and locking element.

26 Claims, 1 Drawing Sheet

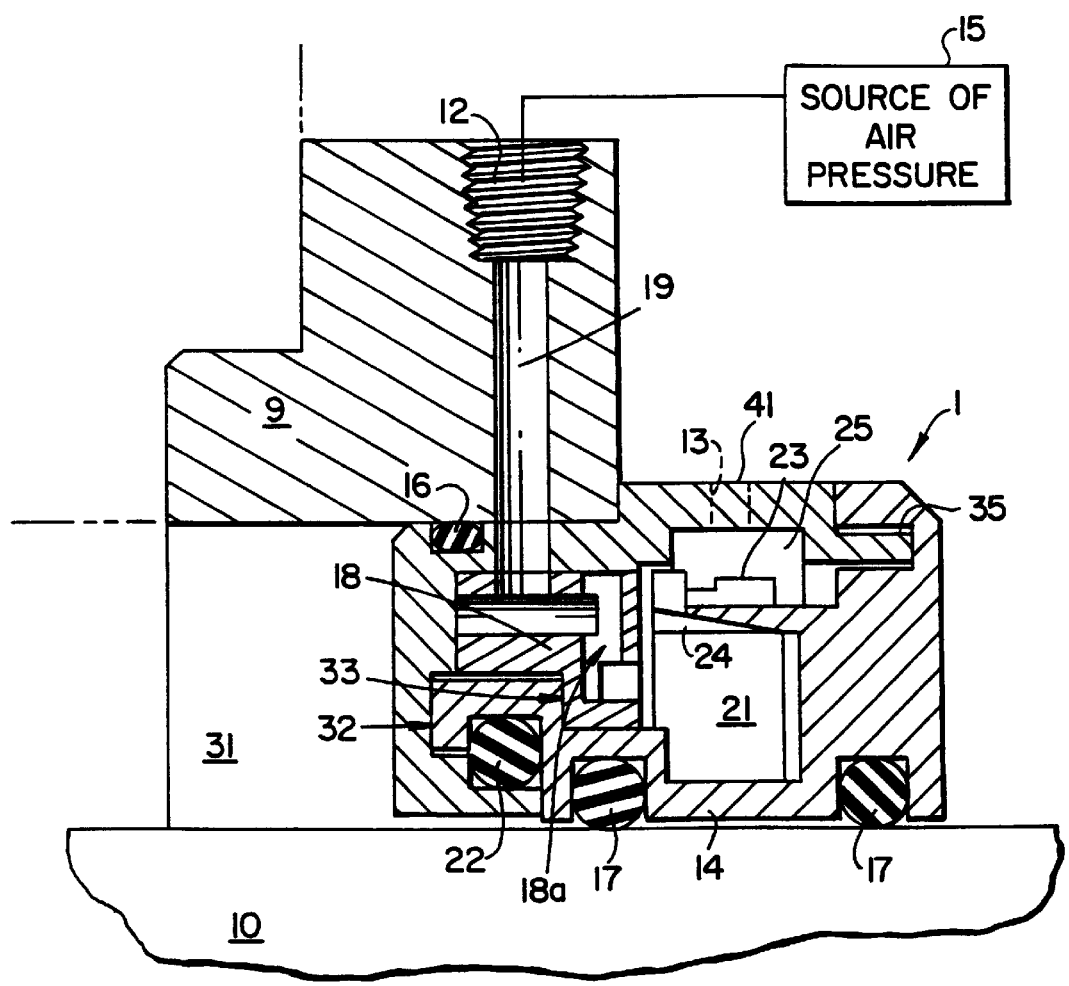

BEARING ISOLATOR WITH AIR PURGE

BACKGROUND OF THE INVENTION

1) Field of the Invention

The field of this invention is the sealing of the bearings especially in high speed peripheral uses where contaminants are present and must be isolated from the bearings.

2) Related Art

Machine tool spindles, because of their high speed rotation, create requirements for maximum reduction or total elimination of contaminants from interacting with the bearings and consequently are a continuing problem for seal and spindle manufacturers. There has long been a belief among seal manufacturers that adding air purging would improve the protection of the bearings, i.e., utilizing a sealing mechanism in conjunction with an air purge. In the prior art lip seals and labyrinth patterns have been combined with an air purge. The air purge pressure has typically been between 5 and 7 psi and has been inserted either outboard or inboard or in the middle of the lip seal labyrinth pattern. These labyrinth patterns with lip seals in combination with seals are and have not been very satisfactory. This is especially true where the seal is subjected to a large amount of coolant deluge and impingement, in which case a substantial amount of coolant can be collected in the area between the labyrinth pattern and the lip seal. The lip seal is then substantially the only sealing member between the bearings and the collected contaminants and coolant. The lip seal, because of pressure and friction, is subjected to a substantial amount of wear and eventual ingress of contaminants or coolant past the lip seal has always occurred.

Speed of rotation or peripheral speed is a factor affecting all sealing devices and lip seals will operate better at low peripheral speeds and for a shorter period of time than other type seals.

Air purge has been operated with bearing isolators similar to those shown and described in U.S. Pat. No. 5,378,000 but with limited success.

Prior air purges have directed the air external to the bearing isolators and the bearing isolator has now merely replaced the lip seal. This arrangement has at least two disadvantages and has not been entirely successful because directing the air purge in front of the bearing isolator causes air, including coolant and debris, due to the pressure, to pass through the isolator and into the bearing housing. Any chips or metallic fines will be trapped by the air pressure around the bearing isolator and will cause increased wear and reduce the bearing efficiency.

Another system of using air to improve theoretically the sealing mechanism of the bearing isolators has been to pressurize the housing. The pressure is normally between 5/10 and 2 psi and is generally introduced at the midpoint of the housing between the bearings. This configuration, when air is applied properly, is compatible with a bearing isolator. However, in as much as the air is being introduced directly into the bearings, cleanliness of the air is extremely important. It is also extremely important to restrict the maximum internal pressure to prevent egress of lubricant and temperature increases in the bearing isolator. This addition of pressure to the bearing housing has been shown to improve bearing isolator performance particularly with slow peripheral or static shafts.

Another example of air combined with bearing isolator usage has been to introduce the air inboard of the bearing isolator and attempting to seal the air from the housing by a normal lip seal or other restricting devices. A port would allow for escape of water or other contaminants contained in the air purge. In this design the lip seal or other restrictive device is still the critical member and limits the life and quality of the sealing effect. This configuration is also mainly satisfactory with slower peripheral speed of spindles or shafts.

Thus, it is important to have a sealing system without utilizing a lip seal and simultaneously able to utilize an air supply which is not necessarily pure, i.e., it may contain contaminants including fluid. Contaminants will migrate past any lip seal, especially at high peripheral speeds.

BRIEF SUMMARY OF THE INVENTION

This invention is designed to keep contaminants from bearings with a bearing isolator and a novel air purge mechanism. The ability to utilize air pressure to improve sealing while isolating the bearings from the air pressure and any contaminants contained therein is the basic improvement of this invention.

This invention provides an improved sealing mechanism whereby with positive contaminant expulsion the seal will have long service life even at high speeds. This invention also provides positive contaminant expulsion when the shaft is at rest.

Housings containing bearings are sometimes operated at slightly less pressure, i.e., below atmospheric, than the external pressure on the housing. In this invention, faces of the rotor and stator abut each other and are axially locked together.

This invention provides a sealing mechanism at high peripheral speed even if the basic sealing ring of the seal lifts off, air pressure reinforces the seal and provides a positive sealing mechanisms at all times. The air purge system is designed to exit the sealing mechanism to expel contaminants and vent the seal. The seal mechanism of this invention may be without air pressure in a static or dynamic condition but will continue to prevent the inflow of contaminants to the bearings.

If the air flow is suspended, interrupted, or not utilized, the bearing seal isolator will operate in a normal fashion to prevent the ingress of contaminants into the bearing area.

DESCRIPTION OF THE DRAWINGS

FIG. 1—is a sectional view showing in detail the assemble of the seal into the housing, including the air system for aiding sealing.

DETAILED DESCRIPTION OF THE INVENTION

The novel seal 1 of this invention is shown with a stator 13 affixed to the housing 9. The rotor 14 is affixed to the shaft 10 and driven by the ring members 17. The novel seal mechanism of this invention may or may not include the seal 16 sealing between the housing 9 and stator 13. The shaft 10 extends through the housing 9 and is surrounded by the seal 1 including the stator 13 and rotor 14. The rotor 14 is affixed to the shaft 10 and rotated with the shaft 10 by the driving or ring members 17. Sealing ring 22, including the cavities 21 and 25 and the corresponding labyrinths formed in the rotor 14 and stator 13 act to effectively seal the ingress or egress of materials including contaminants into the cavity 31 of the housing 9. Those elements of this novel seal were present in the prior art.

The improvements provided by this novel seal include the use of air pressure from a source of air pressure 15 which is connected to the air cap 12. Cap 12 may be capped or permit the air pressure to enter through the cap space 12 into the channel or air passage 19. The air under pressure, which pressure normally would be between 0 and 10 psi, is then directed to the diffuser ring 18 to ensure the air pressure is evenly distributed around the periphery of seal 1 and into the first air chamber or cavity 21. The diffuser ring 18 also locks the rotor 14 and stator 13 together to limit axial movement between the rotor 14 and stator 13. The faces 32 and 33 between the stator 13 and rotor 14 are held in place by the ring 18. The diffuser ring 18 has passages 18a connecting passage 19 to cavity 21. The locking force between the rotor 14 and stator 13 is provided by diffuser 18. Diffuser 18 abuts the stator 13 and rotor 14, and is also held against the stator 13.

There is also provided a first air chamber 21 and the air from the diffuser 18 moves into the air chamber 21 and then moves by a centrifuge action including vane 24 into a second air chamber or cavity 25 and is centrifuged again by the action of the cavity 25 and of the second vane 23 to move the contaminants and/or any fluids to the outside of the cavities or chambers 21 and 25 and may be drained through a drain 41 which may be placed at any location on the isolator but preferably at the bottom or 6 o'clock position of the bearing isolator. Debris may also be expelled through the exit formed by passage 35 between rotor 14 and stator 13. The air flow during static conditions will flow out the exits by gravity and air without centrifuge.

If the shaft 10 is not rotating or is static, then the gravity and air flow drain will evacuate the air chambers 21 and 23 of any and all contaminants, and thus, prevent them from entering the bearing housing.

When no air is applied to the seal 1 through the air passage 19 from the air pressure source 15 and/or the cap 12 is inserted in the air passage 19 then the seal 22 will continue to act as a restrictive path to ensure that any air or contaminants in the air chambers 21 and 25 exit outboard. The sealing ring 22 presents a restrictive path to any air or contaminant in the chambers 21 and 25. The air or contaminants will still be expelled outward through the exit 35 or out the gravity drain 41.

In operation, as the drive rings 17 drive the rotor 14 and the air pressure from source 15 is provided through the cap 12 and the air inlet 19, the diffuser 18 will project this air into the air chamber 21 which provides an area of little resistance for the movement of contaminants into chamber 21 and out through the centrifuge motion. Meanwhile, the sealing ring 22, along with the obstruction and/or labyrinths formed by the cavities 21 and 23 between the stator 13 and rotor 14, will always act to inhibit the movement of any contaminants into the bearing housing 31.

The air pressure and air quantity required is significantly less than the pressure in any of the known air purge systems. Also, because of the ability to centrifuge out of any contaminants included with the air supply, a less expensive, lower quality air source may be utilized which was not possible with the air and vented systems of the prior art. If the air system has been operational and some failure of the air system would occur, the bearing isolator of this invention continues to operate satisfactorily as a seal.

The addition of the air does provide for improved protection and sealing from contamination utilizing only a slight difference in pressure and/or temperature across the bearing isolator. The exit 35 and/or drain 41, offering little resistance to the flow of fluid enhanced by the centrifuging action, forces the contaminants and fluid out the less restrictive exit 35 and/or drain 41. This bearing seal will operate more reliably under all conditions. This requires a lesser pressure and a lesser amount of air applied to the diffuser ring 18 to obtain the improved sealing.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. A seal for a shaft exiting a housing, including:
   a) a housing;
   b) a shaft extending through said housing;
   c) a seal affixed to said housing and surrounding said shaft; and
   d) said seal comprising:
      1) a stator affixed to said housing;
      2) a rotor rotating with said shaft with drive rings;
      3) said stator including a first passage between said housing and said rotor;
      4) a locking mechanism for preventing axial movement of said rotor with respect to said stator;
      5) a plurality of cavities in said rotor or stator acting as a centrifuge for fluid in said cavities including contaminants with the flow of the centrifuged fluid directed to the exterior of the seal;
      6) a second passage from said cavities to the atmosphere for flow of centrifuged fluid and contaminants to exit said seal;
      7) said locking mechanism includes a plurality of passages connecting said first passage between said housing and said plurality of cavities.

2. The invention in accordance with claim 1, wherein said locking mechanism includes a central passage connected to each of a plurality of passages to said first cavity in said locking mechanism.

3. A seal for a shaft exiting a housing, including:
   a) a housing;
   b) a shaft extending through said housing;
   c) a seal affixed to said housing and surrounding said shaft; and
   d) said seal comprising:
      1) a stator affixed to said housing;
      2) a rotor including driving rings rotating with said shaft;
      3) a first passage between said housing and said rotor;
      4) a locking mechanism for preventing axial movement of said rotor with respect to said stator;
      5) a plurality of cavities formed by said rotor and said stator for centrifuging fluid including contaminants with the flow of fluid to said seal to eliminate contaminants;
      6) a second passage from said cavities to allow for flow of fluid and contaminants to exit said seal;
      7) said locking mechanism includes a plurality of passages connecting said first passage between said housing and said rotor to said plurality of cavities.

4. The invention in accordance with claim 3, wherein said locking mechanism includes a central passage connected to each of said plurality of passages in said locking mechanism.

5. A seal for a shaft exiting a housing including;
   a) a housing;
   b) a shaft extending through said housing;
   c) a seal affixed to said housing and surrounding said shaft; and
   d) said seal comprising:
      1) a stator affixed to said housing;
      2) a rotor rotating by drive rings with said shaft, 3) said stator including a first passage between said housing and said rotor;
4) a locking mechanism for preventing axial movement of said rotor with respect to said stator;
5) said locking mechanism including a central passage and a plurality of axial passages connected between said central passage and said rotor;
6) a plurality of cavities in said rotor for centrifuging of fluid; and
7) a second passage for centrifuged fluid to exit said seal.
e) a source of pressurized air;
f) said source connected to said central passageway in said locking mechanism;
g) said locking mechanism having a plurality of passages connected to said cavities, whereby the centrifuged pressurized fluid exits said seal.

6. The invention in accordance with claim 5, wherein said central passage in said locking mechanism is connected to said plurality of passages.

7. The invention in accordance with claim 5, wherein said plurality of cavities includes a first cavity formed in said rotor.

8. The invention in accordance with claim 5, wherein said plurality of cavities includes a second cavity formed between said stator and said rotor.

9. The invention in accordance with claim 5, wherein said second passage for centrifuge material to the exterior of the seal between said rotor and said stator.

10. The invention in accordance with claim 7, wherein said first cavity has a vane to assist in centrifuging the fluid.

11. The invention in accordance with claim 5, wherein said passageway in said housing connecting said source of pressurized fluid to said central passageway is closed.

12. A seal for a shaft exiting a housing including:
a) a housing;
b) a shaft extending through said housing;
c) a seal affixed to said housing and surrounding said shaft; and
d) said seal comprising:
 1) a stator affixed to said housing;
 2) a rotor rotating with said shaft;
 3) said stator including a passage between said housing and said rotor;
 4) a locking mechanism for preventing axial movement of said rotor with respect to said stator;
 5) said locking mechanism including a central passage and a plurality of passages connected to said central passage;
 6) a plurality of cavities for removing of fluid; and
 7) at least one passage for fluid to exit said seal.
e) a source of pressurized fluid;
f) said passageway in said housing connected to said source and to said central passageway in said locking mechanism;
g) said locking mechanism having a plurality of passages connected to said cavities, whereby the pressurized fluid, after passage exits said seal.

13. The invention in accordance with claim 12, wherein said central passage is connected to said plurality of passages.

14. The invention in accordance with claim 12, wherein said plurality of cavities includes at least a first cavity formed in said rotor.

15. The invention in accordance with claim 12, wherein said plurality of cavities includes at a second cavity formed between said stator and said rotor.

16. The invention in accordance with claim 12, wherein said passage to the exterior of the seal is a passage between said rotor and said stator.

17. The invention in accordance with claim 15, wherein a drain connects said second cavity the exterior of the seal.

18. The invention in accordance with claim 14, wherein said first cavity has a vane to assist in removing the fluid and the removal of contaminants.

19. The invention in accordance with claim 15, wherein said second cavity has a vane to assist in removing the fluid and removal of contaminants.

20. The invention in accordance with claim 12, wherein said passageway in said housing connecting said source of pressurized fluid to said central passageway is closed.

21. A seal for a shaft exiting a housing, including:
a) a housing;
b) a shaft extending through said housing;
c) a seal affixed to said housing and surrounding said shaft; and
d) said seal comprising:
 1) a stator affixed to said housing;
 2) a rotor rotating with said shaft;
 3) said stator including a first passage between said housing and said rotor;
 4) a locking mechanism for preventing axial movement of said rotor with respect to said stator;
 5) at least one cavity connected to said first passage is acting as a centrifuged for fluid including contaminants; and
 6) a second passage from said cavity to the atmosphere for flow of centrifuged fluid and contaminants to exit said seal;
 7) said locking mechanism includes a central passage connected to each of a plurality of passages in said locking mechanism.

22. A seal for a shaft exiting a housing, including:
a) a housing;
b) a shaft extending through said housing;
c) a seal affixed to said housing and surrounding said shaft; and
d) said seal comprising:
 1) a stator affixed to said housing;
 2) a rotor rotating with said shaft with drive rings;
 3) said stator including a first passage between said housing and said rotor;
 4) a locking mechanism for preventing axial movement of said rotor with respect to said stator;
 5) a plurality of cavities in said rotor or stator acting as a centrifuge for fluid in said cavities including contaminants with the flow of the centrifuged fluid directed to the exterior of the seal; and
 6) a second passage from said cavities to the atmosphere for flow of centrifuged fluid and contaminants to exit said seal;
 7) a separate cavity is formed in said first passage between said rotor and said stator and filled with a sealing ring.

23. The invention in accordance with claim 3, wherein a separate cavity is formed in said first passage between said rotor and said stator and filled with a sealing ring.

24. The invention in accordance with claim 5, wherein a separate cavity is formed in said first passage between said rotor and said stator and filled with a sealing ring.

25. The invention in accordance with claim 12, wherein a separate cavity is formed in said first passage between said rotor and said stator and filled with a sealing ring.

26. The invention in accordance with claim 21, wherein a separate cavity is formed in said first passage between said rotor and said stator and filled with a sealing ring.

* * * * *